Oct. 18, 1932.  A. B. SHULTZ  1,883,020
BALL AND SOCKET JOINT
Filed May 4, 1929
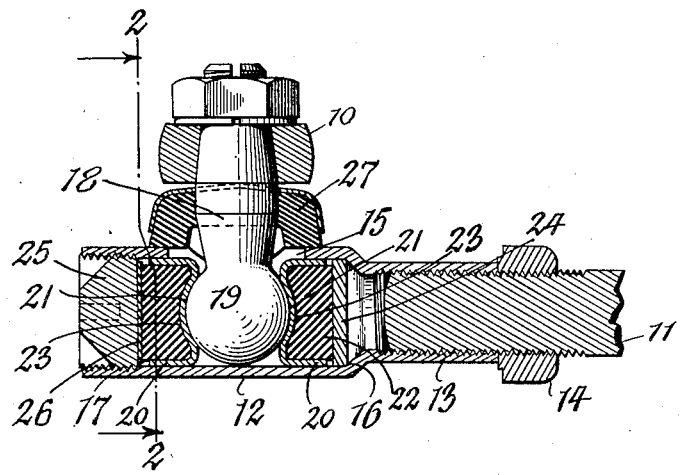
Fig. 1.
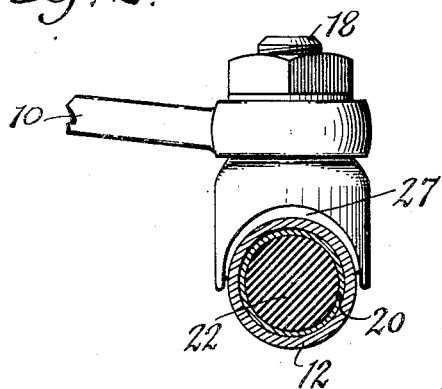
Fig. 2.
Fig. 3.
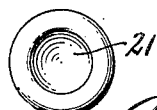
Inventor
Albert B. Shultz
By Popper Powers
Attorneys Patented Oct. 18, 1932

1,883,020

UNITED STATES PATENT OFFICE

ALBERT B. SHULTZ, OF BUFFALO, NEW YORK, ASSIGNOR TO HOUDE ENGINEERING CORPORATION, OF BUFFALO, NEW YORK, A CORPORATION OF NEW YORK

BALL AND SOCKET JOINT

Application filed May 4, 1929. Serial No. 360,502.

This invention relates to a ball and socket joint for coupling two members which have a pivotal movement relatively to one another such as the drag link of a shock absorber and the car frame and lever with which the ends of the link are connected.

It is the object of this invention to provide a joint of this character in which the usual cushioning springs are replaced by resilient blocks of rubber and direct metallic contact between the link and the frame and lever is eliminated so that the vibrations are transmitted without producing any noise or producing unduly rapid wear.

In the accompanying drawing:

Fig. 1 is a longitudinal section of a ball and socket joint embodying the preferred form of this invention.

Fig. 2 is a cross section of the same taken on line 2—2, Fig. 1.

Fig. 3 is an end view of one of the ball seats.

In the following description similar characters of reference indicate like parts in the several figures of the drawing:

Although this ball and socket joint may be utilized to advantage in various installations containing relatively movable swinging members the same is shown, for example, in the present instance between the lever or rock arm 10 of a shock absorber mounted on the frame of a car and a drag link 11 which is connected with the axle of the running gear.

The numeral 12 represents the tubular head of the joint, the inner end of which is adjustably connected by a screw joint 13 with the drag link and held in place therein by a clamping nut 14 working on the link and engaging the adjacent end of the head. Between its outer and inner end the tubular head is provided with a laterally extending opening 15 and between said opening and the drag link the head is provided with an internal shoulder 16. At its outer end the head is provided with an internal screw thread 17.

A neck 18 extends transversely through the lateral opening 15 in the head and is connected at its outer end with the lever 10 and provided at its inner end within the head with a ball 19.

On opposite sides of the ball are two sheet metal ferrules each of which is preferably constructed of bronze and provided with a cylindrical body 20 which engages with the bore of the tubular head and a transverse wall at its front end having a concave seat 21 on its front side and a convex face on its rear side, the seats of the two ferrules engaging with opposite sides of the ball.

Arranged within each ferrule is a cylindrical block or cushion 22 of resilient material, preferably rubber, the front end of each of these cushions being provided with a concave depression 23 which engages with the convex rear face of the wall of the respective ferrule. The rear end of the inner cushion is supported by an abutment consisting of a disk 24 arranged between the rear end of the inner cushion and the internal shoulder 16 of the tubular head. The rear end of the outer cushion is supported by an abutment consisting preferably of an adjustable screw plug 25 working in the screw thread 17 of the tubular head and bearing at its front end against the rear end of the outer cushion by means of a washer 26 interposed between the same.

Foreign matter is excluded from the contacting surfaces between the ball and its concave seats by a closure 27, preferably of rubber which is mounted on the neck 18 and bears against the adjacent part of the periphery of the head so as to cover the opening 15 thereof.

This form of joint eliminates direct metallic contact between the drag link and the members with which the same is coupled and maintains a yielding pressure against the ball so that the joint can work free without producing any noise when the parts vibrate and without causing any undue wear on the working surfaces.

I claim as my invention:

A ball and socket joint to couple two members which are substantially normal to each other and to prevent noise being transmitted from one member to the other, said joint comprising a tubular head having an enlarged front part and a reduced rear part forming an internal shoulder, the enlarged part having an opening in a side thereof, a ball member entered in said enlarged front part with a neck extending through the side opening, means to support said ball member for pivotal movement and to prevent noise being transmitted along said tubular head when said ball member is vibrated, said means comprising a pair of sheet metal cups within the enlarged part of the head having concaved surfaces to engage opposed surfaces of said ball member, a rubber plug entered in each of said cups with a portion extending from said cups, means to position said rubber plugs and said cups, said means comprising an abutment member engaging the internal shoulder and one of said plugs, an abutment member screwed in the forward end of the enlarged part to engage the other rubber plug, said rubber plug having concaved ends complemental to the convexed inner surfaces of said cups.

In testimony whereof I hereby affix my signature.

ALBERT B. SHULTZ.